United States Patent
Tsirkin

(10) Patent No.: US 9,846,610 B2
(45) Date of Patent: Dec. 19, 2017

(54) PAGE FAULT-BASED FAST MEMORY-MAPPED I/O FOR VIRTUAL MACHINES

(71) Applicant: Red Hat Israel, Ltd., Raanana (IL)

(72) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 15/018,043

(22) Filed: Feb. 8, 2016

(65) Prior Publication Data

US 2017/0228271 A1 Aug. 10, 2017

(51) Int. Cl.
G06F 11/00 (2006.01)
G06F 11/07 (2006.01)
G06F 9/455 (2006.01)

(52) U.S. Cl.
CPC ........ *G06F 11/079* (2013.01); *G06F 9/45558* (2013.01); *G06F 11/0721* (2013.01); *G06F 2009/45587* (2013.01)

(58) Field of Classification Search
USPC .......................................... 714/37
See application file for complete search history.

(56) References Cited

U.S. PATENT DOCUMENTS

| | | |
|---|---|---|
| 5,812,823 A | 9/1998 | Kahle et al. |
| 5,953,520 A | 9/1999 | Mallick |
| 8,099,730 B2 | 1/2012 | Wang et al. |
| 8,161,243 B1 | 4/2012 | Wagh et al. |
| 8,239,610 B2 | 8/2012 | van Riel et al. |
| 8,392,628 B2 | 3/2013 | Santos et al. |
| 8,819,676 B2 | 8/2014 | Ports et al. |
| 8,838,914 B2 | 9/2014 | Adams et al. |
| 8,954,959 B2 | 2/2015 | Tsirkin et al. |
| 9,122,594 B2 | 9/2015 | Mahalingam |
| 2002/0129226 A1 | 9/2002 | Eisen et al. |
| 2003/0046505 A1 | 3/2003 | Craddock et al. |
| 2003/0212883 A1 | 11/2003 | Lee et al. |
| 2005/0091383 A1 | 4/2005 | Bender et al. |

(Continued)

OTHER PUBLICATIONS

KVM: MMU: Fast Page Fault, https://lwn.net/Articles/489307/, Mar. 29, 2012, Xiao Guangrong, 3 pages.

(Continued)

*Primary Examiner* — Sarai Butler
(74) *Attorney, Agent, or Firm* — Lowenstein Sandler LLP

(57) ABSTRACT

Implementations provide for page fault-based fast memory-mapped I/O for virtual machines. A method of the disclosure includes detecting, by a processing device executing a hypervisor on a host machine, a protection fault at the hypervisor, the protection fault caused by a guest of the hypervisor attempting to write to an address marked as valid and read-only in a host page table entry at the hypervisor, the address associated with memory-mapped input-output (MMIO) for a virtual device of the guest, referencing, by the processing device, a MMIO data structure of the hypervisor with the address that caused the protection fault, identifying, by the processing device, the virtual device and a MMIO-based instruction mapped to the address in the MMIO data structure at the hypervisor, and executing, by the processing device, the MMIO instruction at the hypervisor on behalf of the guest.

20 Claims, 5 Drawing Sheets

(56) References Cited

U.S. PATENT DOCUMENTS

| | | |
|---|---|---|
| 2005/0204357 A1 | 9/2005 | Garg et al. |
| 2006/0010440 A1 | 1/2006 | Anderson et al. |
| 2006/0259292 A1 | 11/2006 | Solomon et al. |
| 2008/0005447 A1 | 1/2008 | Schoenberg et al. |
| 2008/0215770 A1 | 9/2008 | Liu et al. |
| 2008/0307180 A1 | 12/2008 | Hattori et al. |
| 2009/0037936 A1 | 2/2009 | Serebrin |
| 2009/0144731 A1 | 6/2009 | Brown et al. |
| 2009/0276775 A1 | 11/2009 | Brown et al. |
| 2009/0300263 A1 | 12/2009 | Devine et al. |
| 2010/0037096 A1 | 2/2010 | Bum et al. |
| 2010/0138616 A1 | 6/2010 | Banga et al. |
| 2010/0162243 A1 | 6/2010 | Barde et al. |
| 2010/0250824 A1 | 9/2010 | Belay |
| 2011/0153909 A1 | 6/2011 | Dong |
| 2011/0179418 A1 | 7/2011 | Takebe et al. |
| 2011/0296411 A1 | 12/2011 | Tang et al. |
| 2012/0033673 A1 | 2/2012 | Goel |
| 2012/0072619 A1 | 3/2012 | Tsirkin et al. |
| 2012/0137292 A1 | 5/2012 | Iwamatsu et al. |
| 2012/0159039 A1 | 6/2012 | Kegel et al. |
| 2012/0167082 A1 | 6/2012 | Kumar et al. |
| 2014/0068137 A1 | 3/2014 | Kegel et al. |
| 2014/0173338 A1* | 6/2014 | Arroyo ............... G06F 11/1412 714/15 |
| 2014/0173628 A1 | 6/2014 | Ramakrishnan Nair |
| 2014/0379956 A1 | 12/2014 | Chang et al. |
| 2015/0026379 A1 | 1/2015 | Yang et al. |
| 2015/0095548 A1 | 4/2015 | Tsirkin et al. |
| 2015/0127969 A1* | 5/2015 | Arroyo ............... G06F 11/2097 714/4.5 |
| 2015/0149997 A1 | 5/2015 | Tsirkin et al. |
| 2015/0199283 A1 | 7/2015 | Epstein |
| 2016/0062810 A1* | 3/2016 | Von Wendorff ...... G06F 11/079 714/38.1 |

OTHER PUBLICATIONS

Re: [Patch RFC] kvm: add PV MMIO EVENTFD, http://lkml.iu.edu/hypermail/linux/kernel/1304.0/02758.html, Apr. 4, 2013, Michael S. Tsirkin, 2 pages.

[Patch] KVM: MMU: Avoid Fast Page Fault Fixing Mmio Page Fault, https://lkml.org/lkml/2013/7/18/6, Xiao Guangrong, Jul. 18, 2013, 1 page.

Willmann et aL, "Protection Strategies for Direct Access to Virtualized 1/0 Devices" USENIX Annual Technical Reference 2008, pp. 15-28, USENIX Association.

USPTO, Office Action for U.S. Appl. No. 14/043,132, dated Mar. 1, 2016.

USPTO, Final Office Action for U.S. Appl. No. 14/043,132, dated Jun. 6, 2016.

USPTO, Office Action for U.S. Appl. No. 14/043,132, dated Dec. 13, 2016.

USPTO, Final Office Action for U.S. Appl. No. 14/043,132, dated Apr. 4, 2017.

USPTO, Advisory Action for U.S. Appl. No. 14/043,132, dated Jun. 20, 2017.

USPTO, Office Action for U.S. Appl. No. 14/089,105, dated Jan. 7, 2016.

USPTO, Final Office Action for U.S. Appl. No. 14/089,105, dated Jun. 27, 2016.

USPTO, Notice of Allowance for U.S. Appl. No. 14/089,105, dated Jul. 26, 2017.

* cited by examiner

MMIO Lookup Data Structure 128

| Virtual Device MMIO Address 205a | Device ID 210a | Data 215a | Length 220a | MMIO Instruction 225a |
| --- | --- | --- | --- | --- |
| Virtual Device MMIO Address 205b | Device ID 210b | Data 215a | Length 220b | MMIO Instruction 225b |
| . . . | | | | . . . |
| Virtual Device MMIO Address 205n | Device ID 210n | Data 215a | Length 220n | MMIO Instruction 225c |

FIGURE 2

PAGE FAULT-BASED FAST MEMORY-MAPPED I/O FOR VIRTUAL MACHINES

TECHNICAL FIELD

The implementations of the disclosure relate generally to a computer system and, more specifically, relate to page fault-based fast memory-mapped I/O for virtual machines.

BACKGROUND

A central processing unit (CPU) may access a peripheral device, such as a printer or video card using memory mapped input-output (MMIO). MMIO employs the same address bus to address both physical memory and I/O devices (e.g., physical peripheral devices). Each of the memory as well as registers of I/O devices are mapped to (associated with) memory address values. When an address is accessed by the CPU, the accessed address may refer to a portion of physical RAM, but it can also refer to memory (e.g., registers) of an I/O device in an address space of the I/O device. CPU instructions employed to access the physical memory may also be used for accessing peripheral (I/O) devices as well. Each I/O device monitors the address bus of the CPU and responds to any CPU access of an address assigned to the I/O device, connecting the data bus associated with the CPU to the hardware register of the I/O device. To accommodate I/O devices, blocks of addresses used by the host I/O device may be reserved for I/O and not be available for CPU physical memory.

Virtualization permits multiplexing of an underlying host machine (associated with a physical CPU) between different virtual machines. The host machine or "host" allocates a certain amount of its resources to each of the virtual machines. Each virtual machine may then use the allocated resources to execute applications, including operating systems (referred to as guest operating systems (OS) of a "guest"). The software layer providing the virtualization is commonly referred to as a hypervisor and is also known as a virtual machine monitor (VMM), a kernel-based hypervisor, or a host operating system of the host.

A virtual machine may access a virtual device using guest page addresses corresponding to memory space assigned to the virtual device for purposes of communicating with the virtual device, which is known as memory-mapped input/output (MMIO). The hypervisor may expose a virtual device to the guest to permit the guest to execute instructions on the virtual device. If a virtual device is a virtual peripheral device, such as a virtual printer or virtual video card, the virtual device may be accessed using memory mapped input-output (MMIO).

When a guest address is accessed by the guest, the accessed guest address may refer to a portion of guest RAM or to guest memory of a virtual I/O device. CPU instructions used to access the guest memory may be used for accessing virtual I/O devices. To accommodate virtual I/O devices, blocks of guest addresses used by the virtual devices may be reserved for I/O and not be available for guest physical memory.

During execution of an MMIO-based instruction of the guest, the guest may attempt to access a guest address mapped to a memory space corresponding to the virtual device. The associated CPU typically translates the guest address to a hypervisor address by "walking" through page table entries of a host page table located in the host memory. In the host page table, entries for guest addresses mapped to a memory space of the virtual device are typically marked as invalid, or reserved, to prevent the guest from directly accessing such addresses and, thus, trigger an exit to the hypervisor. Consequently, the results of this relatively computationally-expensive page walk are not stored ("cached") by the CPU, and the page walk has to be re-executed on each access. On exit to the hypervisor, the hypervisor is usually provided by the CPU with only the guest address that the guest attempted to access. In order for the hypervisor to identify the associated MMIO instruction(s) and associated parameter(s) (e.g., one or more operands), the hypervisor typically executes a lookup in a hypervisor data structure. As all devices in the virtual machine (on which the guest is running) using MMIO should have an entry in the hypervisor data structure, this hypervisor data structure might potentially be very large, and the lookup can be relatively computationally expensive.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIG. 2 is a block diagram that illustrates one example of a configuration of a MMIO instruction data structure.

DETAILED DESCRIPTION

Figure 1:
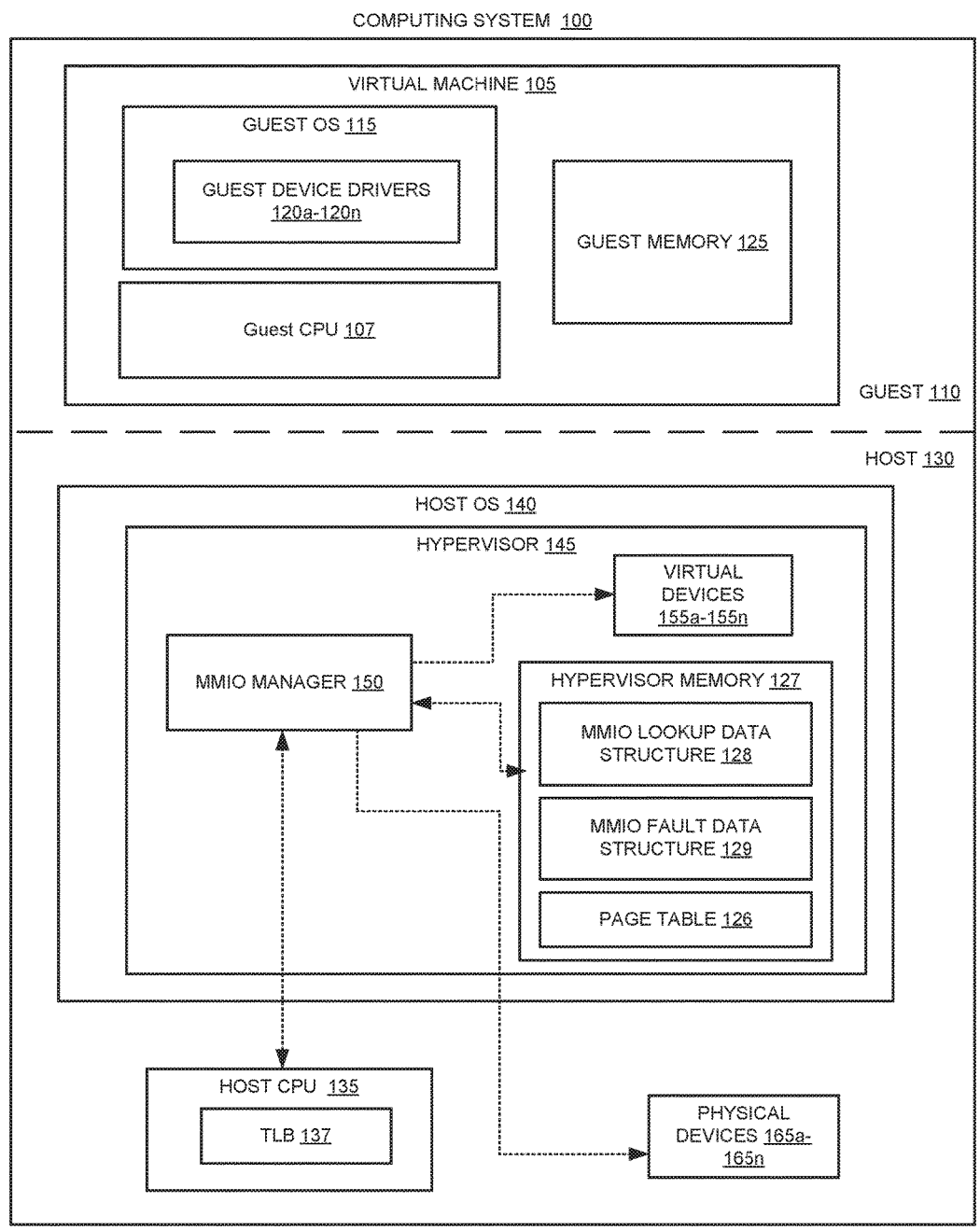
FIG. 1 is a block diagram that illustrates an example computing system in which examples of the present disclosure may operate.

Implementations of the disclosure provide for page fault-based fast memory-mapped I/O (MMIO) for virtual machines (VMs). In implementations of the disclosure, page table entries (PTEs) associated with MMIO-based memory space of a virtual device are marked as valid and read-only. In a virtualization system, when a guest (i.e., a VM) uses a MMIO-based instruction to access a virtual device, the guest attempts to access a guest address mapped to a memory space of the virtual device. In turn, the host CPU translates the guest address to a hypervisor address by "walking" through PTEs of a host page table located in the hypervisor memory. Instead of marking host PTEs for guest addresses mapped to memory space of a virtual device as non-present or reserved (as was done in prior solutions), these entries are marked as valid and read-only in implementations of the disclosure. By marking PTEs associated with MMIO-based memory space of a virtual device as valid and read-only, implementations of the disclosure allow the host CPU to cache the address translation in a translation lookaside buffer (TLB) and thus avoid the overhead due to page table lookups, while still allowing the benefits of MMIO functionality. Additionally, the hypervisor receives from the CPU an indication that the PTE was valid. This might allow the hypervisor to execute the lookup in a separate, smaller data structure that may include entries of a subset of virtual devices, thus making the lookup faster.

In previous solutions, a page being accessed by a guest via MMIO was marked as non-present or reserved in host CPU page tables. As a result, guest access to the page triggered an exit to the hypervisor. However, these MMIO accesses are slower when used as hypercalls due to the execution of instruction emulation in software. One previous solution provided a decoding bypass for MMIO that allowed memory accesses to avoid the decoding process. However, this solution still introduced overhead due to a page table walk and translation on each access. This overhead could be masked by using a TLB cache. However, the TLB cache was not performed for previous approaches to virtualization MMIO, as the PTEs are marked as reserved and thus are not cached. In addition, another source of overhead found in previous solution includes a data structure lookup performed by the hypervisor. This overhead could be masked by using a separate data structure only for high-speed devices (e.g., such as MMIO devices). However, the hypervisor was not provided any indication from the CPU that the device accessed is a high-speed device.

Accordingly, an efficient method and system is provided that enables a guest to execute an MMIO instruction with low overhead. The method described herein improves processing time by avoiding the overhead associated with computationally-expensive instruction retrieval operations to obtain page translation information used for execution of the MMIO instruction. By marking the page table entries as read-only and valid, the address translation may be stored in cache (e.g., TLB), thus avoiding overhead associated with page table walks in future access of the address. Additionally, by receiving from the CPU an indication that the PTE is valid, the hypervisor can optimize the device lookup, for example, by executing a lookup in a smaller data-structure that includes addresses with valid PTEs.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram that illustrates an example computing system 100 in which examples of the present disclosure may operate. The computing system 100 hosts a virtual machine (VM) 105. The virtual machine 105 runs a guest (e.g., guest 110) that uses a guest operating system 115 to manage its resources. The virtual machine 105 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a host system that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest 110, etc.

In one example, the computing system 100 runs a hypervisor 145 to virtualize or expose access to underlying host hardware (e.g., the physical devices 165a-165n) of a host 130, making the use of the virtual machine 105 transparent to the guest 110 and the users of the computing system 100. In one example, the hypervisor 145 may support the virtual machine 105. In one example, the hypervisor 145 is part of a host operating system (OS) 140 of the host 130.

In an example, the computing system 100 also includes hardware components (host hardware) including a host central processing unit (CPU) 135. The computing system 100 may also include host memory (not shown) and physical devices 165a-165n. In a virtualized environment, a virtual machine 105 may not have direct access to the physical devices 165a-165n.

Access to or emulation of a physical device (e.g., 165a) may be indirectly handled by the intervening hypervisor 145. The guest 110 may be configured to load device-specific modules (guest device drivers) 120a-120n associated with one or more virtual devices 155a-155n. The hypervisor 145 is configured to emulate (e.g., provide the guest 115 with access to) the one or more virtual devices 155a-155n in cooperation with the guest device drivers 120a-120n residing on the virtual machine 105.

When the guest 110 attempts to access a virtual device (e.g., 155a) using an MMIO-based instruction, the guest 110 may attempt to access a guest address mapped to a memory space of the virtual device (e.g., 155a). The host CPU 135 translates the guest address to a hypervisor address by "walking" through page table entries of a page table 126 located in the hypervisor memory 127. In one implementation, in the page table 126, entries for guest addresses mapped to a memory space of the virtual device can be marked as valid and read-only. By marking page table entries associated with MMIO-based memory space as valid and read-only, implementations of the disclosure allow the host CPU 130 to cache the address translation in a translation lookaside buffer 137 and thus avoid the overhead due to page table lookups, while still allowing MMIO functionality. Additionally, by receiving from the CPU 135 an indication that the page table entry is valid, the hypervisor 145 can optimize the device (i.e., virtual device 155a-155n) lookup, for example, by executing a lookup in a smaller data-structure, such as MMIO lookup data structure 128 discussed further below, that includes the addresses having valid PTEs.

When the virtual device 155a-155n is loaded in the guest 110, corresponding guest device drivers 120a-120n are installed in the guest 110. For example, one device driver (e.g., 120a) may be configured to transmit packets to an external network (not shown, e.g., the Internet). Another device driver (e.g., 120b, 120n) may be responsible for writing data or reading data, respectively, outside of the virtual machine 105. When the guest 110 is loaded with a virtual device 155a-155n that includes corresponding MMIO memory pages, the guest 110 is informed about an identifier (ID) of the virtual device. The corresponding device driver(s) 120a-120n for the virtual device 155a-155n that are loaded in the guest 110 may create the writable mappings for the MMIO memory pages of the virtual device 155a-155n.

Once the virtual device 155a-155n is loaded in the guest 110, the guest 110 may inform the hypervisor 145, and specifically the MMIO manager 150 of hypervisor 145, of one or more guest page addresses of the MMIO memory pages of the virtual device 155a-155n. In some implementations, the guest 110 may also provide data and length corresponding to the guest page addresses of the MMIO memory pages of the virtual device 155a-155n.

For each received guest page address (or address plus data), a MMIO manager 150 of the hypervisor 145 creates a mapping in a hypervisor data structure 128, 129 maintained by the hypervisor. In an implementation, the hypervisor 145 may maintain multiple data structures, such as MMIO lookup data structure 128 and MMIO fault data structure 129, and create the mapping in one or more of the data structures 128, 129. In some implementations, other data structures in addition to those illustrated and described with respect to FIG. 1 may be maintained and utilized by the hypervisor 145.

FIG. 2 is a block diagram of an exemplary MMIO data structure, such as MMIO lookup data structure 128 described with respect to FIG. 1, according to implementations of the disclosure. The MMIO lookup data structure 128 maps the received guest address 205a-n, or guest address and data 215a-n or guest address, data, and length 220a-n, to a virtual device identifier (ID) 210a-n and MMIO instruction 225a-n corresponding to the address 205a-n. The MMIO instructions 225a-n may include a read instruction or a write instruction and associated parameters (e.g., an address to read or write a second parameter) to cause a device action to be executed. The MMIO manager 150 may know the virtual device ID and MMIO instruction because the hypervisor 145 virtualizes the devices 155a-n for the guest 110.

In one embodiment, the received guest address may be used to identify an additional set of memory locations associated with the received address. The additional set of memory locations may correspond to one or more general purpose registers. The MMIO instruction data structure 128 may include pointers to the one or more general purpose registers. The one or more general purpose registers may store an indication of a type of MMIO instruction to execute. The one or more general purpose registers may further store additional information about the MMIO instruction. The additional information may comprise an MMIO address associated with an MMIO-based device or one or more parameters associated with the MMIO instruction.

Referring back to FIG. 1, for each received guest page address associated with MMIO memory pages of the virtual device 155a-155n, the MMIO manager 150 marks corresponding host page table entry in the guest page table 126 as write-protected (i.e., read-only) and valid. Subsequently, when the guest 110 attempts to access, via a write operation, the page address mapped to the memory space of the virtual device, a protection violation is detected as the page is marked read-only in the page table 126 of the hypervisor memory 127. This triggers a fault into the hypervisor 145.

When the guest 110 attempts to access the address that causes the fault from the guest 110 to the hypervisor 145, the hypervisor 145 receives the address that has caused the fault. In one implementation, the hypervisor 145 may also determine the data written to a data bus as part of the guest write into the page. The hypervisor 145 then determines that the received address (or address plus data) may correspond to a MMIO-based instruction performed on the virtual device or a physical device by referencing the MMIO instruction data structure 128 maintained by the hypervisor 145. The MMIO manager 150 may determine the virtual device and corresponding action to perform from the MMIO lookup data structure 128. The MMIO lookup data structure 128 used for this determination may be separate from another data structure, such as MMIO fault data structure 129, used for handling faults (e.g., protection violation faults) corresponding to non-valid page table entries. This reduces the size of the MMIO lookup data structure 128, thus reducing the lookup overhead. The hypervisor 145 may then execute the MMIO-based instruction on behalf of the guest 110. If there is a lookup failure when the hypervisor 145 references the MMIO lookup data structure 128 with the guest address (or with address plus data or address plus data plus length), the hypervisor 145 may signal an error to the guest 110 or stop execution of the guest 110.

In some implementations, the guest 110 may be configured to execute a read before executing a write operation. As the MMIO memory pages of implementations of the disclosure are marked valid and read-only, a read on the page place a page translation into the translation lookaside buffer (TLB) of the host CPU. In other implementations, the guest 110 may be configured to perform a read at predetermined intervals, such as before every X number (e.g., 1000) of writes. When the page translation exists in the TLB, the host CPU avoids the overhead due to page table lookup, while still allowing MMIO functionality.

The MMIO manager 150 may be configured to execute the identified instruction on behalf of the guest 110 using the identified instruction and one or more identified operands.

Figure 3:
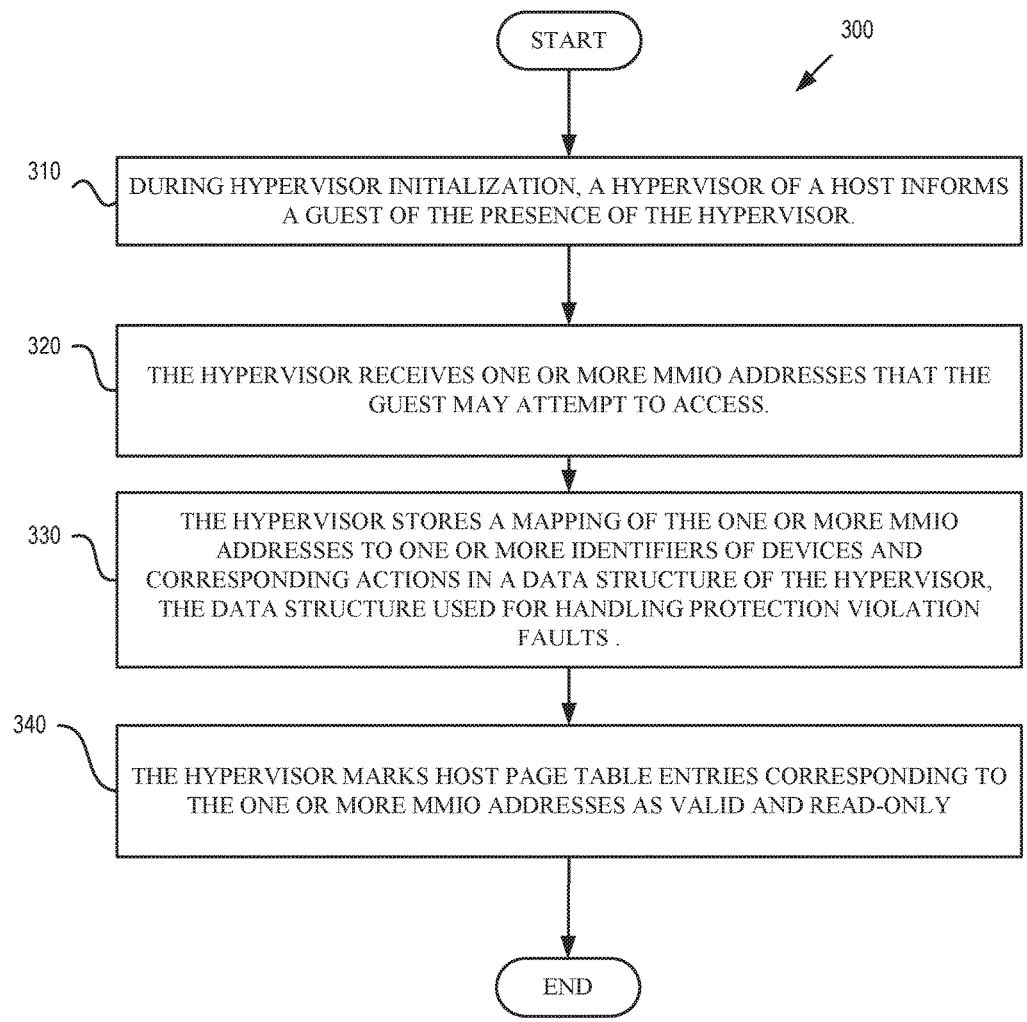
FIG. 3 is a flow diagram illustrating a method for configuring page fault-based fast MMIO for virtual machines according to implementations of the disclosure.

FIG. 3 is a flow diagram illustrating a method 300 for configuring page fault-based fast MMIO for virtual machines according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by MMIO manager 150 of FIG. 1.

Method 300 begins at block 310 where, during hypervisor initialization, a hypervisor of a host informs a guest of the presence of the hypervisor. At block 320, the hypervisor receives one or more MMIO addresses that the guest may attempt to access. Then, at block 330, the hypervisor stores a mapping of the one or more MMIO addresses to one or more identifiers of devices and corresponding actions in a data structure of the hypervisor used for handling protection violation faults. Lastly, at block 340, the hypervisor marks host page table entries corresponding to the one or more MMIO addresses as valid and read-only.

Figure 4:
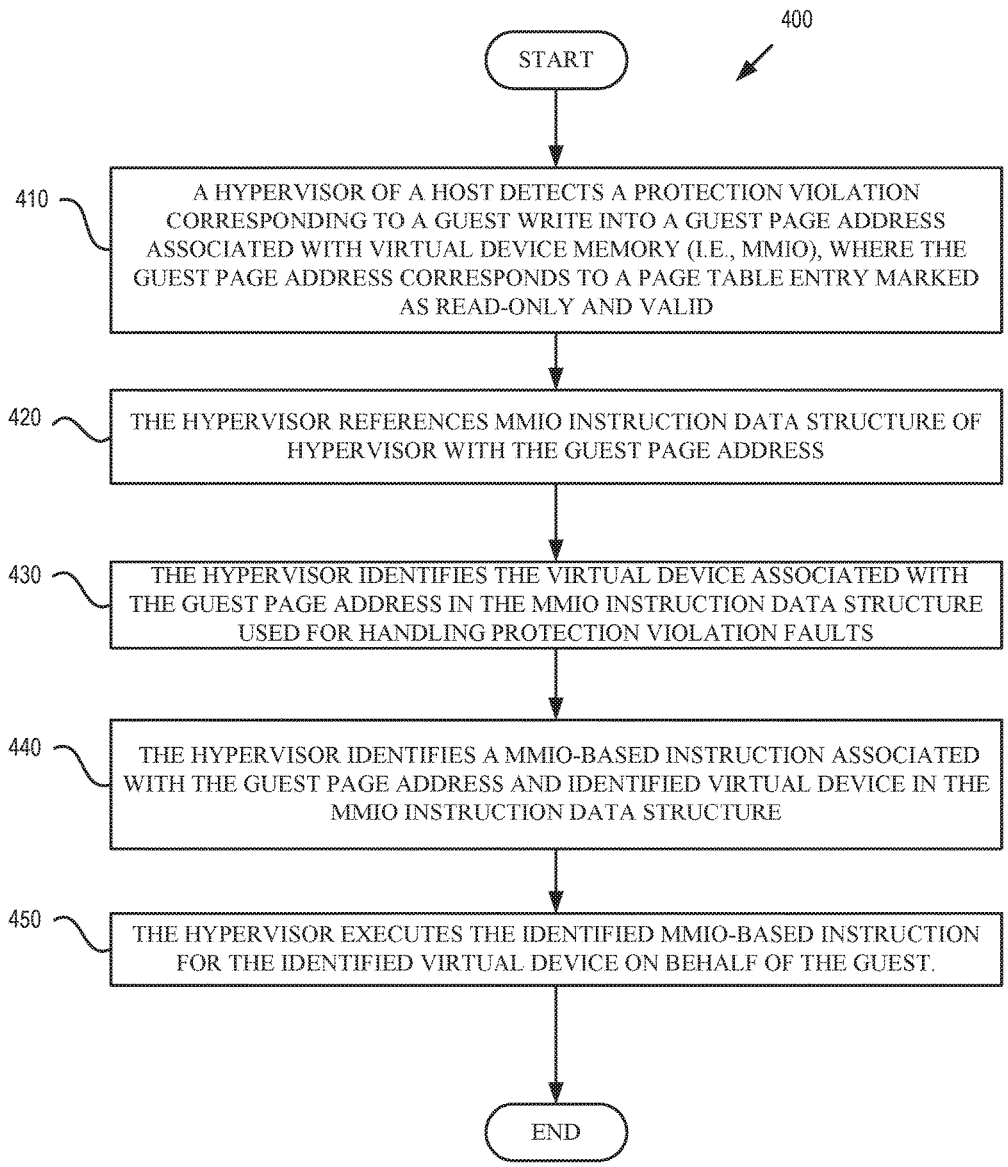
FIG. 4 is a flow diagram illustrating a method for performing page fault-based fast MMIO for virtual machines according to implementations of the disclosure.

FIG. 4 is a flow diagram illustrating a method 400 for performing page fault-based fast MMIO for virtual machines according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by MMIO manager 150 of FIG. 1.

Method 400 begins at block 410 where a hypervisor of a host detects a protection violation corresponding to a guest write into a guest page address associated with virtual device memory (i.e., MMIO), where the guest page address corresponds to a page table entry marked as read-only and valid. Then, at block 420, the hypervisor references a MMIO instruction data structure of the hypervisor with the guest page address. At block 430, the hypervisor identifies the virtual device associated with the guest page address in the MMIO instruction data structure used for handling protection violation faults. At block 440, the hypervisor identifies a MMIO-based instruction associated with the guest page address and identified virtual device in the MMIO instruction data structure. Lastly, at block 450, the hypervisor executes the identified MMIO-based instruction for the identified virtual device on behalf of the guest.

Figure 5:
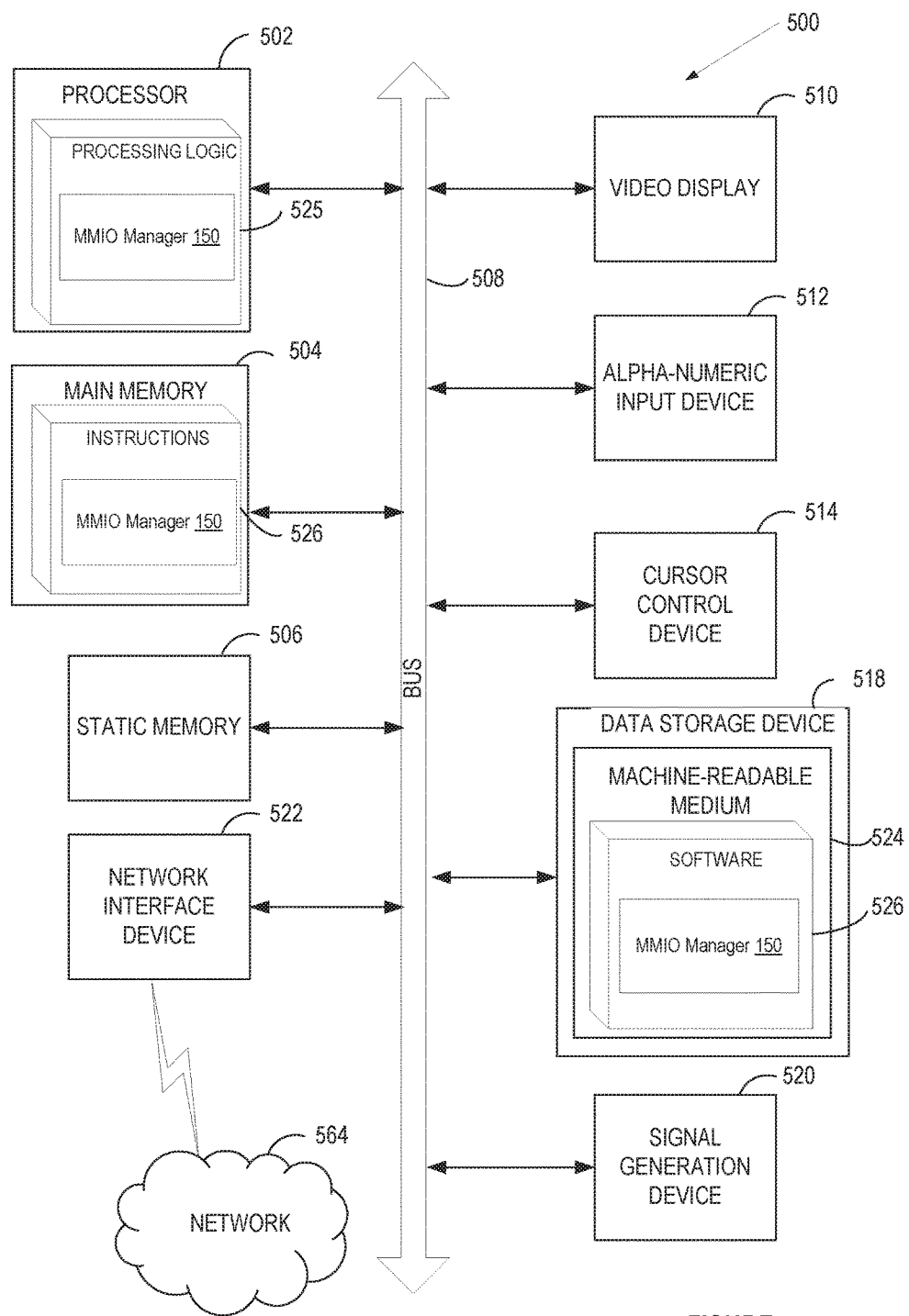
FIG. 5 illustrates a block diagram of one implementation of a computer system.

FIG. 5 illustrates a diagrammatic representation of a machine in the example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508 communicably coupled to a network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 to implement MMIO manager 150 to provide page fault-based fast MMIO for virtual machines in a computer system, such as the computer system described with respect to FIG. 1, and/or a software library containing methods that call the above applications. While the machine-accessible storage medium 528 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "invoking", "launching", "accessing", "assembling", "committing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
   detecting, by a processing device executing a hypervisor on a host machine, a protection fault at the hypervisor, the protection fault caused by a guest of the hypervisor attempting to write to an address marked as valid and read-only in a host page table entry at the hypervisor, the address associated with memory-mapped input-output (MMIO) for a virtual device of the guest;
   referencing a MMIO data structure of the hypervisor with the address corresponding to the protection fault;
   identifying, by the processing device, the virtual device and a MMIO-based instruction mapped to the address in the MMIO data structure; and
   executing, by the processing device, the MMIO-based instruction at the hypervisor on behalf of the guest.

2. The method of claim 1, further comprising, during hypervisor initialization:
   informing the guest, by the hypervisor, of the presence of the hypervisor;
   requesting the guest, by the hypervisor, to provide one or more MMIO addresses with corresponding virtual device identification;
   receiving from the guest, by the hypervisor, the one or more MMIO addresses with the corresponding virtual device identification;
   determining, by the hypervisor, MMIO instructions that correspond with each of the received one or more MMIO addresses; and
   storing, by the hypervisor, the one or more MMIO addresses with the corresponding virtual device identification and corresponding MMIO instructions in the MMIO data structure.

3. The method of claim 1, further comprising marking, by the hypervisor, host page table entries corresponding to one or more MMIO addresses comprising the address as valid and read-only.

4. The method of claim 1, wherein the MMIO data structure further comprises, for each entry corresponding to a MMIO address, at least one of the MMIO-based instruction, a virtual device identifier, data comprising one or more operands for the MMIO-based instruction, the type of the page fault detected, or a length of the data.

5. The method of claim 1, further comprising:
   detecting, by the hypervisor, a second page fault associated with a second non valid or reserved host page table entry; and
   referencing, by the processing device, a second MMIO data structure of the hypervisor with the address that caused the second page fault.

6. The method of claim 1, further comprising, responsive to the MMIO data structure having no match for at least one of (i) the address, (ii) the address and the data, or (iii) the address, the data, and the length, signaling an error to the guest and exiting to the hypervisor.

7. The method of claim 1, wherein a translation of the address is stored in a translation lookaside buffer (TLB) when the guest accesses the address.

8. The method of claim 1, wherein the guest performs a read operation on the address prior to the attempt to write to the address.

9. The method of claim 8, wherein the read operation is performed after a determined number of write instructions are executed.

10. The method of claim 1, wherein, when the virtual device is loaded in the guest, guest device drivers for the virtual device create writable mappings for pages corresponding to the memory space of the virtual device.

11. A computer system comprising:
   a memory;
   a host processing device, coupled to the memory, to execute a hypervisor from the memory, the hypervisor to virtualize resources of the computer system for one or more guests, wherein the host processing device to:
      detect a protection fault at the hypervisor, the protection fault caused by a guest of the hypervisor attempting to write to an address marked as valid and read-only in a host page table entry at the hypervisor, the address associated with memory-mapped input-output (MMIO) for a virtual device of the guest;
      reference a MMIO data structure of the hypervisor with the address corresponding to the protection fault;
      identify the virtual device and a MMIO-based instruction mapped to the address in the MMIO data structure; and
      execute the MMIO-based instruction at the hypervisor on behalf of the guest.

12. The computer system of claim 11, wherein the processing device is further to cause the hypervisor to, during hypervisor initialization:
   inform the guest of the presence of the hypervisor;

requesting the guest, by the hypervisor, to provide one or more MMIO addresses with corresponding virtual device identification;

receiving from the guest, by the hypervisor, the one or more MMIO addresses with the corresponding virtual device identification;

determining, by the hypervisor, MMIO instructions that correspond with each of the received one or more MMIO addresses; and storing, by the hypervisor, the one or more MMIO addresses with the corresponding virtual device identification and corresponding MMIO instructions in the MMIO data structure.

13. The computer system of claim 11, further comprising marking, by the hypervisor, host page table entries corresponding to one or more MMIO addresses comprising the address as valid and read-only.

14. The computer system of claim 11, wherein the MMIO data structure further comprises, for each entry corresponding to a MMIO address, at least one of a MMIO-based instruction, a virtual device identifier, data comprising one or more operands for the MMIO-based instruction, or a length of the data.

15. The computer system of claim 11, wherein a translation of the address is stored in a translation lookaside buffer (TLB) when the guest accesses the address.

16. The computer system of claim 11, wherein the guest performs a read operation on the address prior to the attempt to write to the address.

17. A non-transitory computer-readable storage medium including instructions that, when accessed by a processing device, cause the processing device to:

request, by the processing device executing a hypervisor on a host machine, a guest of the hypervisor to provide one or more memory-mapped input-output (MMIO) addresses to the hypervisor, the MMIO addresses associated with memory space of a virtual device of the guest;

receive, from the guest, the one or more MMIO addresses at the hypervisor;

determine MMIO instructions that correspond with each of the received one or more MMIO addresses;

storing, by the processing device, the one or more MMIO addresses with corresponding virtual device identification and the corresponding MMIO instructions in a MMIO data structure of the hypervisor; and marking, by the processing device, host page table entries corresponding to the one or more MMIO addresses as valid and read-only in a host page table entry at the hypervisor.

18. The non-transitory computer-readable storage medium of claim 17, wherein the processing device further to:

detect a protection fault at the hypervisor, the protection fault caused by the guest of the hypervisor attempting to write to an address of the MMIO addresses;

reference a MMIO data structure of the hypervisor with the address that caused the protection fault;

identify the virtual device and a MMIO-based instruction mapped to the address in the MMIO data structure at the hypervisor; and execute the MMIO instruction at the hypervisor on behalf of the guest.

19. The non-transitory computer-readable storage medium of claim 17, wherein a translation of the address is stored in a translation lookaside buffer (TLB) when the guest accesses the address.

20. The non-transitory computer-readable storage medium of claim 17, wherein the guest performs a read operation on the address prior to the attempt to write to the address.

* * * * *